Sept. 3, 1957 F. J. FUCHS, JR 2,804,787
CENTERING DEVICE FOR RECTANGULAR WAVE GUIDES
Filed Aug. 18, 1954
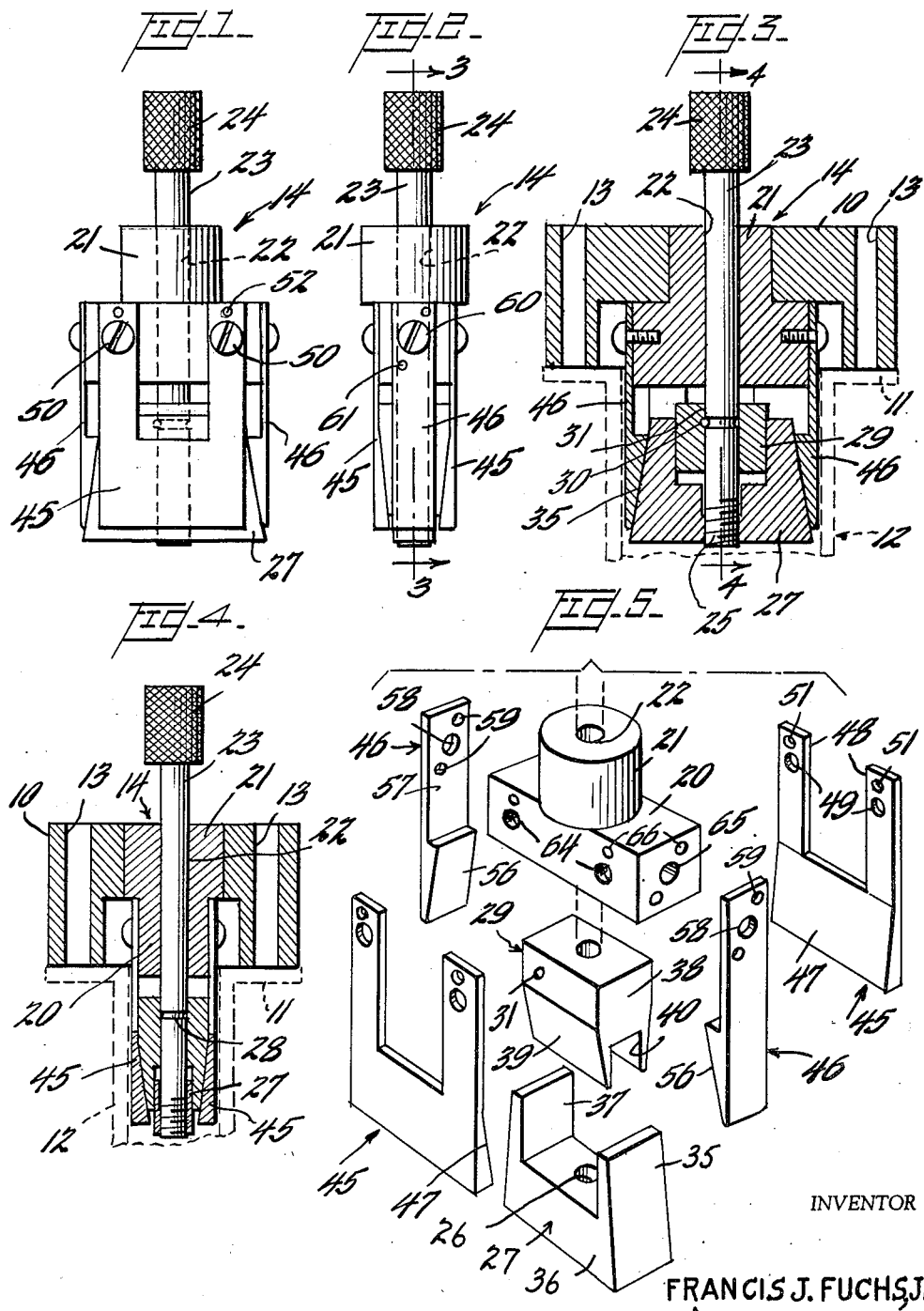
INVENTOR
FRANCIS J. FUCHS, Jr.
BY a. C. Schwarz, Jr.
ATTORNEY

United States Patent Office 2,804,787
Patented Sept. 3, 1957

2,804,787

CENTERING DEVICE FOR RECTANGULAR WAVE GUIDES

Francis J. Fuchs, Jr., Winston-Salem, N. C., assignor to Western Electric Company, Incorporated, New York, N. Y., a corporation of New York Application August 18, 1954, Serial No. 450,757

2 Claims. (Cl. 77—62)

This invention relates to a centering device and more particularly to a gauge for locating the center of rectangular tubing such as wave guides to facilitate the performing of various operations on the wave guides.

In the manufacture of wave guides for use in electronic equipment, it frequently becomes necessary to accurately determine the exact center of the wave guide so that a template or other device may be properly positioned to drill accurately located holes in flanges of the wave guide or for other uses.

It is an object of the present invention to provide a highly accurate and easily manipulatable centering device.

In accordance with one embodiment of the invention, a centering device which may have another device, for example a template, mounted upon it, is constructed to accurately center itself with respect to the longitudinal center line of the wave guide and comprises oppositely tapered members which may be moved relative one to another by a common actuator to press flexible locating plates against the inner walls of a wave guide, the flexible members being mounted upon a block which also supports the actuator for the oppositely tapered members.

A complete understanding of the invention may be obtained from the following detailed description when considered in conjunction with the accompanying drawings wherein:

Fig. 1 is a side elevational view of a centering device made in accordance with the present invention;

Fig. 2 is an end elevational view of the device shown in Fig. 1;

Fig. 3 is a transverse sectional view taken on the line 3—3 of Fig. 2 in the direction of the arrows showing a section of wave guide in dot and dash lines and showing a template mounted on the centering device;

Fig. 4 is a cross-sectional view taken on the line 4—4 of Fig. 3 in the direction of the arrows;

Fig. 5 is an exploded view of substantially all of the parts of the device.

Referring now to the drawings, it will be seen that the device is particularly useful for locating a device, such as a template 10, with respect to the flange 11 of a rectangular wave guide 12. The template 10 is provided with guide passages 13 which may be used to guide a drill bit into engagement with the flange 11 of the wave guide 12 after the template has been accurately aligned therewith by means of the centering device constituting the subject matter of the present invention and which is designated generally with the reference numeral 14.

The centering device 14 comprises a block 20 which is oblong in configuration and which has formed integrally therewith a cylindrical portion 21. The cylindrical portion 21 is centrally located with respect to the main portion of the block 20 and has a centrally located aperture 22 for receiving a shaft 23. The shaft 23 has a knurled head 24 at one end and a threaded portion 25 at its opposite end.

It should be noted that the shaft is not shown in Fig. 5 since it would only complicate the disclosure but it will be understood that the shaft is threaded into a threaded aperture 26 formed in a tapered lower block 27. Intermediate its ends the shaft 23 has an annular groove 28 formed in it whereby a second tapered block 29 may be connected to the shaft 25 for preventing relative longitudinal movement between the shaft and the block 29 but permitting rotary movement of the shaft 23 with respect to the block 29. A pin 30 driven into an aperture 31 in the block 29 enters the groove 28 thereby to prevent longitudinal movement between the block 29 and the shaft 23 while permitting the shaft to rotate with respect to the block.

The first or lower block 27 has its ends 35 tapered to incline inwardly toward the upper end of the shaft 23 whereas its sides 36 are in planes parallel to the axis of the shaft 23. The upper end of the block 27 has a rectangular cutout 37 the end walls of which are in planes parallel to the axis of the shaft 23. This cutout is adapted to receive the body of the block 29 which has its ends 38 extending in planes parallel to the axis of the shaft 23 whereas its sides 39 are tapered outwardly toward the upper or knurled portion of the shaft 23. There is a rectangular cutout 40 formed in the body of the block 29. The side walls of the rectangular cutout 40 are spaced apart sufficiently so that they will slidingly engage the sides 36 of the lower or first block 27 whereas the side walls of the cutout 37 are spaced apart so that they will slidingly engage the ends 38 of the upper or second block 29. Thus the two blocks may slide with respect one to another but are restricted against any turning movement with respect one to another when the shaft 23 is rotated to move the block 27 with respect to the block 29.

The tapered sides 39 of the block 29 and the tapered ends 35 of the block 27 serve as camming surfaces for flexible plates 45 and 46 respectively. The plates 45 each comprises a tapered body portion 47 and two upstanding flexible portions 48. The flexible portions are each provided with an aperture 49 for receiving the shank of a round head machine screw 50 and with apertures 51 for receiving locating pins 52. The lower ends of the plates 45 are tapered so as to complement the tapered sides of the block 29 whereby when the block 29 is moved relatively downwardly, both of the plates 45 will be moved radially outwardly with respect to the center line of the shaft 23.

The flexible plates 46 are provided with tapered body portions 56 and upwardly extending flexible portions 57 near the upper end of each of which there are located a screw receiving aperture 58 and two pin receiving apertures 59 for receiving the shank of a round head machine screw 60 and locating pins 61 respectively.

The rectangular portion of the block 20 is provided with suitably threaded apertures 64 for receiving the screws 50 and with other threaded apertures 65 for receiving the screws 60. Similarly the pins 52 and 61 may enter locating apertures 66 in the block 20.

In the operation of the device a template 10 may be secured in any suitable manner to the main supporting block 20 or other templates or devices to be accurately located with respect to the center line of a section of wave guide may be suitably secured to the block 20 and thereupon the shaft 23 may be manipulated by means of its knurled portion to move the lower block 27 away from the upper block 29 thereby permitting the flexible plates 45 and 46 to assume their normal position where they will not be stressed outwardly. It will be noted that due to the engagement of the oppositely tapered surfaces of the blocks 27 and 29, with the tapered surfaces of the plates 45 and 46, the blocks will be loosely held in approximately the position shown in Figs. 3 and 4 by the flexible plates 45 and 46. After the blocks 27 and 29 have been moved apart to relieve any tension on the flexible plates 45 and 46, the device may be inserted in the end of the wave guide 12 as shown in Figs. 3 and 4 and thereafter upon proper manipulation of the shaft 23 the tapered surfaces of the blocks 27 and 29 will cooperate with tapered portions 47 and 56 of the flexible plates 45 and 46 to cam the lower ends of the plates outwardly from the axis of the shaft 23. Each of the plates will be cammed outwardly equal amounts and consequently, will float the device 14 into concentricity with the wave guide 12 whereby the axis of the shaft 23 will be exactly at the longitudinal center of the wave guide and thereby a template 10 or other device which it is desired to locate with respect to the exact center of the wave guide 12 may be positioned with a high degree of accuracy.

It will be understood that the embodiment herein described is merely illustrative of the invention and that modifications thereof may be made without departing from the scope of the invention.

What is claimed is:

1. A centering device for locating other devices relative to the longitudinal center of rectangular tubing comprising a pair of oppositely tapered members having interengaging surfaces for locking them against rotation with respect to each other, means for imparting rectilinear movement of said members relative one to the other, flexible means actuated by said tapered members for engaging the inner walls of said tubing, and a floating block supporting said last mentioned means and said movement imparting means.

2. A centering device for locating other devices relative to the longitudinal center of rectangular tubing comprising a support block of rectangular cross-section having an accurately located central bore, a shaft slidable and rotatable in said bore and having a head at one end and a threaded portion at the other end thereof, a first pair of flexible plates fixed to the opposite ends of said block and each having a free end extending a substantial distance beyond said block, each plate also having a tapered portion at its free end, a second pair of flexible plates fixed to the sides of said block and each having a free end extending a substantial distance beyond said block, each plate having a tapered face at its free end, a first block having a tapped central bore for receiving the threaded end of said shaft and having tapered ends for engaging the tapered portions of said first pair of flexible plates, a second block having a central bore for rotatably receiving said shaft and having tapered portions at its sides for engaging the tapered face of said second pair of flexible plates, said first and second blocks having rectangular cutouts therein whereby they will slide with respect one to another but will be maintained against rotation relative one to another, and means for preventing longitudinal movement of said shaft relative to said second block.

References Cited in the file of this patent
UNITED STATES PATENTS 1,618,037    Wright  ---------------- Feb. 15, 1927